United States Patent
Jackson et al.

(10) Patent No.: US 12,493,462 B2
(45) Date of Patent: Dec. 9, 2025

(54) SYSTEMS AND METHODS FOR DETECTING USAGE OF UNDERMAINTAINED OPEN-SOURCE PACKAGES AND VERSIONS

(71) Applicant: Optum, Inc., Minnetonka, MN (US)

(72) Inventors: Anne Jackson, Waban, MA (US); Nicolaus Christiaan Thirion, Scottsdale, AZ (US); Ziqian Huang, Buffalo Grove, IL (US); Jack R. Freier, Saint Paul, MN (US)

(73) Assignee: Optum, Inc., Minnetonka, MN (US)

( * ) Notice: Subject to any disclaimer, the term of this patent is extended or adjusted under 35 U.S.C. 154(b) by 128 days.

(21) Appl. No.: 18/357,375

(22) Filed: Jul. 24, 2023

(65) Prior Publication Data
US 2025/0036400 A1    Jan. 30, 2025

(51) Int. Cl.
*G06F 8/71* (2018.01)
*G06F 8/77* (2018.01)

(52) U.S. Cl.
CPC . *G06F 8/71* (2013.01); *G06F 8/77* (2013.01)

(58) Field of Classification Search
CPC .................................. G06F 8/71; G06F 8/77
See application file for complete search history.

(56) References Cited

U.S. PATENT DOCUMENTS

| | | | |
|---|---|---|---|
| 10,268,684 B1 * | 4/2019 | Denkowski | G06F 40/44 |
| 10,528,741 B1 | 1/2020 | Collins et al. | |
| 10,579,509 B2 * | 3/2020 | Banuelos | G06F 11/368 |
| 11,023,356 B2 | 6/2021 | Anders et al. | |
| 11,281,998 B2 * | 3/2022 | Ben-Arie | G06F 18/2321 |
| 11,586,436 B1 * | 2/2023 | Jennings | G06F 8/61 |
| 12,197,912 B2 * | 1/2025 | Balasubramanian | G06F 8/73 |
| 12,323,449 B1 * | 6/2025 | Graves | H04L 63/10 |
| 2014/0075336 A1 * | 3/2014 | Curtis | H04L 41/22 715/753 |
| 2020/0097608 A1 * | 3/2020 | Xiu | G06F 16/35 |
| 2020/0226490 A1 * | 7/2020 | Abdulaal | G06N 20/00 |
| 2021/0374563 A1 * | 12/2021 | Jezewski | G06F 9/453 |
| 2022/0114490 A1 * | 4/2022 | Das | G06N 3/088 |
| 2022/0261597 A1 * | 8/2022 | Panwar | G06N 20/00 |
| 2023/0125150 A1 * | 4/2023 | Cutler | G06F 18/214 706/15 |
| 2023/0196184 A1 * | 6/2023 | Dong | G06N 3/09 706/12 |
| 2023/0222386 A1 * | 7/2023 | Li | G06N 20/00 706/12 |
| 2023/0297886 A1 * | 9/2023 | Glaser | G06N 20/00 706/12 |
| 2024/0160997 A1 * | 5/2024 | Hertzberg | G06N 20/20 |

\* cited by examiner

Primary Examiner — Douglas M Slachta
(74) Attorney, Agent, or Firm — Alston & Bird LLP

(57) ABSTRACT

Various embodiments of the present disclosure provide methods, apparatus, systems, computing devices, computing entities, and/or the like for identifying stale or vibrant open-source packages by training a predictive machine learning model with a labeled dataset, wherein the labeled dataset is created by generating package-basis features and version-basis features based on repository data, generating package-basis clusters based on the package-basis features, generating version-basis clusters based on the version-basis features, and generating labels for the labeled dataset based on the package-basis clusters and the version-basis clusters.

20 Claims, 10 Drawing Sheets

| Cluster | Variable | RS_Own | RS_NC | RS_Ratio |
|---|---|---|---|---|
| 0 | 0 | lines_one_day | 0.660392 | 0.170666 | 0.409496 |
| 1 | 0 | lines_one_week | 0.868578 | 0.330755 | 0.199361 |
| 2 | 0 | lines_one_month | 0.811922 | 0.347828 | 0.288388 |
| 3 | 0 | commits_one_day | 0.702812 | 0.213382 | 0.377795 |
| 4 | 0 | commits_one_week | 0.909987 | 0.365104 | 0.143193 |
| 5 | 0 | commits_one_month | 0.855964 | 0.408340 | 0.243444 |
| 6 | 1 | internal_count_lib | 0.529955 | 0.065261 | 0.502862 |
| 7 | 1 | num_ver | 0.735079 | 0.154148 | 0.313290 |
| 8 | 1 | avg_release_gap | 0.914987 | 0.180646 | 0.103756 |
| 9 | 1 | median_release_gap | 0.921240 | 0.170008 | 0.094893 |
| 10 | 1 | recent_release_gap | 0.674279 | 0.143348 | 0.380225 |
| 11 | 1 | initial_release_gap | 0.614949 | 0.066211 | 0.421379 |
| 12 | 2 | size | 0.490494 | 0.334152 | 0.765198 |
| 13 | 2 | subscribers | 0.859129 | 0.303616 | 0.202290 |
| 14 | 2 | stargazers_count | 0.898664 | 0.380430 | 0.144855 |
| 15 | 2 | forks_count | 0.956177 | 0.394307 | 0.072352 |
| 16 | 2 | network_count | 0.922068 | 0.365995 | 0.122919 |
| 17 | 2 | open_issues | 0.652771 | 0.249906 | 0.462914 |
| 18 | 2 | project_age | 0.225200 | 0.008875 | 0.781738 |

FIG. 8

SYSTEMS AND METHODS FOR DETECTING USAGE OF UNDERMAINTAINED OPEN-SOURCE PACKAGES AND VERSIONS

BACKGROUND

Various embodiments of the present disclosure address technical challenges related to application management systems and provide solutions to assess reliability and upkeep of open-source packages and versions.

BRIEF SUMMARY

In general, various embodiments of the present disclosure provide methods, apparatus, systems, computing devices, computing entities, and/or the like for identifying vibrancy or staleness of open-source packages and versions.

In some embodiments, a computer-implemented method comprises: receiving, by one or more processors, a prediction input comprising an identification of one or more open-source packages and versions; generating, by the one or more processors and using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by: (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with the plurality of training open-source versions based on the repository data, (e) generating, using a version-basis clustering machine learning model, a plurality of version-basis clusters based on the one or more version-basis features, wherein the plurality of version-basis clusters comprises respective one or more cluster data objects associated with the plurality of training open-source versions, (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and providing, by the one or more processors, the prediction output, wherein the prediction output is configured to initiate the performance of one or more prediction-based actions based on the prediction output.

In some embodiments, a computing apparatus comprising memory and one or more processors communicatively coupled to the memory, the one or more processors configured to: receive a prediction input comprising an identification of one or more open-source packages and versions; generate, using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by: (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with the plurality of training open-source versions based on the repository data, (e) generating, using a version-basis clustering machine learning model, a plurality of version-basis clusters based on the one or more version-basis features, wherein the plurality of version-basis clusters comprises respective one or more cluster data objects associated with the plurality of training open-source versions, (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and provide the prediction output, wherein the prediction output is configured to initiate the performance of one or more prediction-based actions based on the prediction output.

In some embodiments, one or more non-transitory computer-readable storage media including instructions that, when executed by one or more processors, cause the one or more processors to receive a prediction input comprising an identification of one or more open-source packages and versions; generate, using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by: (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with the plurality of training open-source versions based on the repository data, (e) generating, using a version-basis clustering machine learning model, a plurality of version-basis clusters based on the one or more version-basis features, wherein the plurality of version-basis clusters comprises respective one or more cluster data objects associated with the plurality of training open-source versions, (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and provide the prediction output, wherein the prediction output is configured to initiate the performance of one or more prediction-based actions based on the prediction output.

BRIEF DESCRIPTION OF THE DRAWINGS

FIG. 8 is an operational example of variables comprising package-basis features in accordance with some embodiments of the present disclosure.

DETAILED DESCRIPTION

Figure 1:
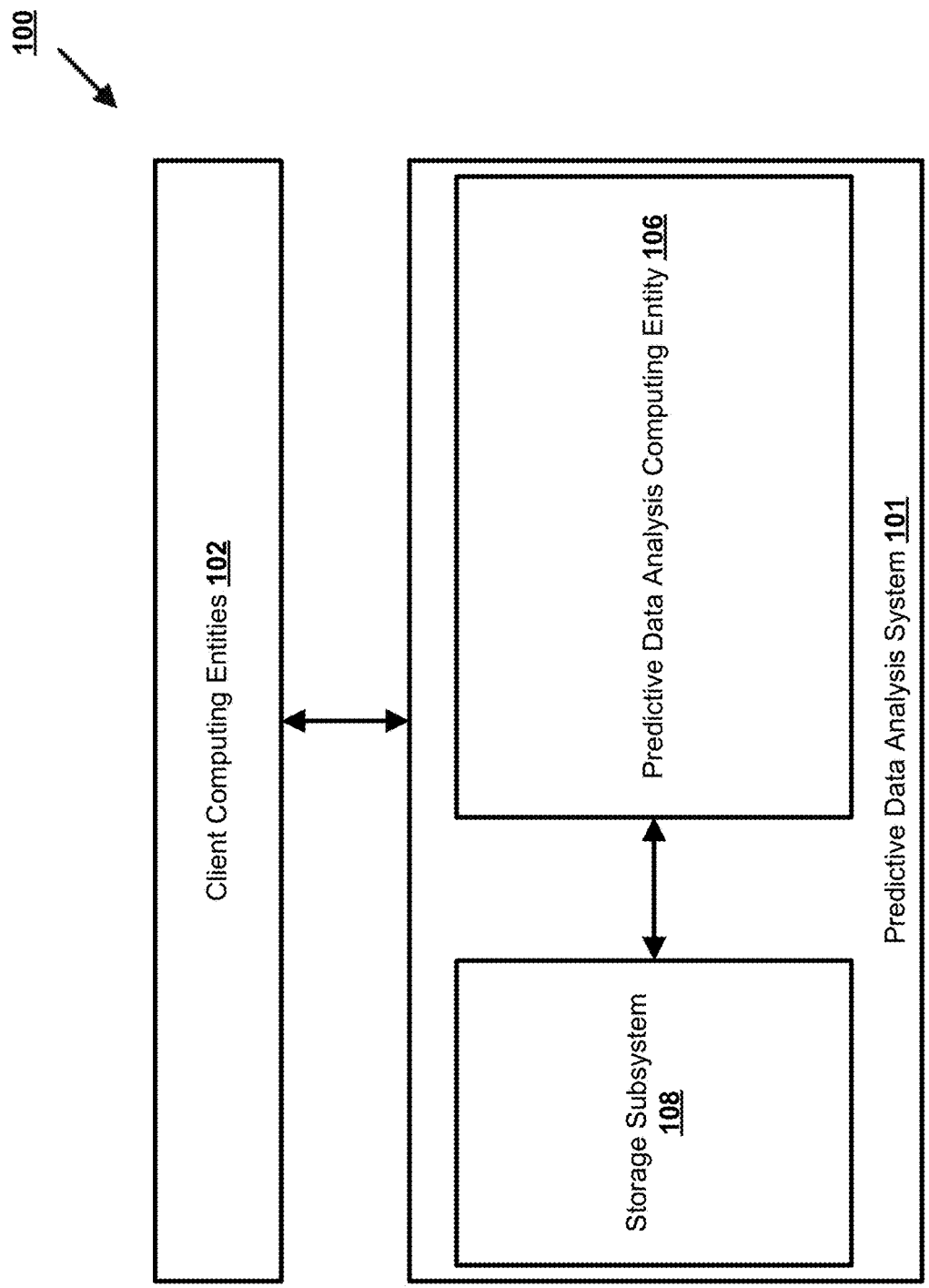
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically initiate performance of prediction-based actions based on the generated predictions.

An example of a prediction-based action that can be performed using the predictive data analysis system 101 comprises receiving a request for analyzing open-source packages and versions that may be currently used or executed by one or more computing systems or can be potentially used by the one or more computing systems, generating vibrancy or staleness ratings for the one or more open-source packages and versions, and displaying the result of the analysis and/or ratings on a user interface. Other examples of prediction-based actions comprise generating a diagnostic report (e.g., a list of open-source packages and versions and their vibrancy or staleness ratings), displaying/providing resources, generating and/or executing action scripts, generating alerts or reminders, or generating one or more electronic communications based on the analysis and/or vibrancy or staleness ratings.

In accordance with various embodiments of the present disclosure, a predictive machine learning model may be trained with at least a machine-labeled training dataset based on package and version-based variables extracted from repository data to predict whether open-source packages and versions are stale or vibrant. Staleness and vibrancy may comprise classifications indicative of whether an open-source package and/or version is likely to be maintained or supported given that open-source software lack the support of a traditional software lifecycle. The disclosed techniques enable application management systems to identify computing systems that are executing undermaintained, unsupported, or deprecated open-source packages and versions and to facilitate determination of actions that can be taken to update or replace such open-source packages and versions. Accordingly, open-source packages and versions that should be reviewed and potentially revised to comply with desired operational and coding practices can be identified. The techniques described herein may also provide intervention to determine open-source packages and versions that lack support or maintenance and potential vulnerabilities associated thereof.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically initiate performance of prediction-based actions based on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Predictive Data Analysis Computing Entity

Figure 2:
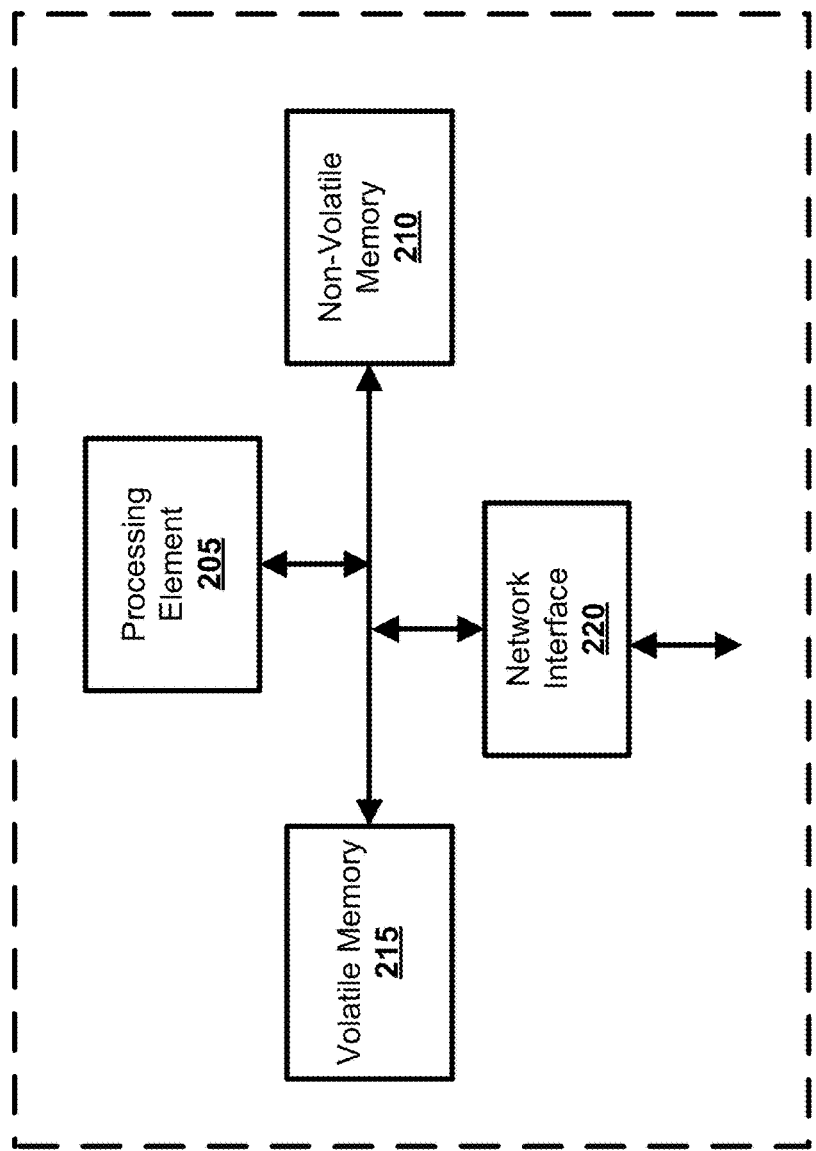
FIG. 2 provides an example predictive data analysis computing entity in accordance with some embodiments of the present disclosure.

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 may further include, or be in communication with, volatile media (also referred to as volatile storage, memory, memory storage, memory circuitry and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 3:
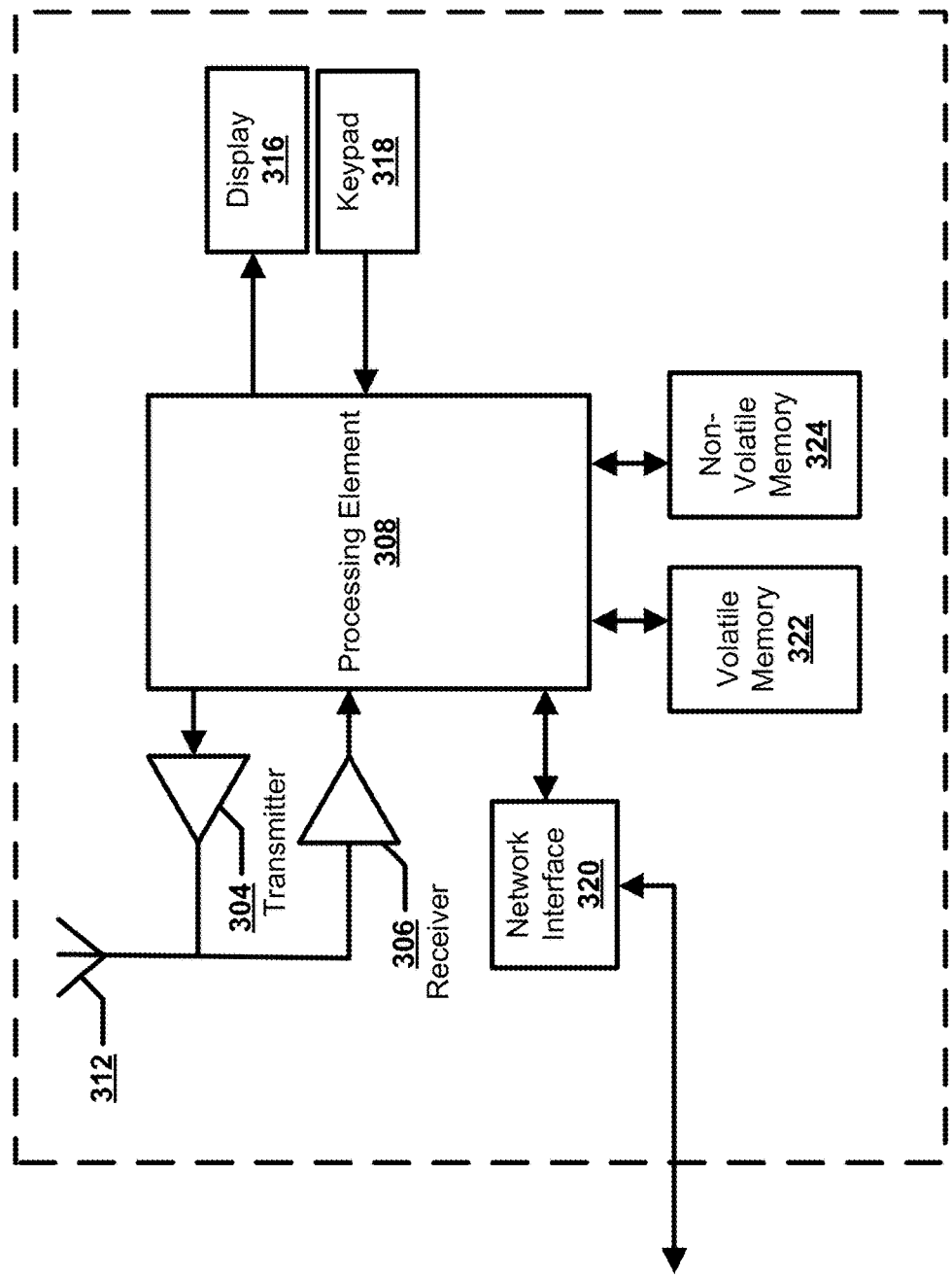
FIG. 3 provides an example client computing entity in accordance with some embodiments of the present disclosure.

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FORAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the client computing entity 102 or accessible through a browser or other user interface for communicating with the predictive data analysis computing entity 106 and/or various other computing entities.

In another embodiment, the client computing entity 102 may include one or more components or functionalities that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "prediction input" may refer to a data construct that describes a data input that can be received and processed by a predictive machine learning model. A predictive machine learning model may generate a prediction output based on a prediction input. According to various embodiments of the present disclosure, a prediction input comprises an identification of one or more open-source packages and versions. The one or more open-source packages and versions may comprise source code written in programming languages, such as Java, JavaScript, .NET, C. C#, C++, Python, Visual Basic, SQL, or PHP. The identification of the one or more open-source packages and versions may comprise an identification of one or more packages and versioning associated with the one or more packages or an entirety of the one or more open-source packages and versions.

In some embodiments, the term "prediction output" may refer to a data construct that describes a prediction generated by a predictive machine learning model based on a prediction input. According to various embodiments of the present disclosure, a prediction output generated by a predictive machine learning model may comprise respective one or more ratings of staleness or vibrancy of one or more open-source packages and versions associated with a prediction input. In some embodiments, the prediction output may also comprise a probability of staleness or vibrancy associated with the one or more open-source packages and versions.

In some embodiments, the term "stale" or "staleness" may refer to a data construct that describes a classification associated with a prediction output comprising an indication of an open-source package or version being unlikely to be maintained, or likely being end of life, undermaintained, unsupported, or deprecated. For example, open-source packages and versions associated with small communities and modest amounts of activity may be classified as stale. As another example, open-source packages and versions that are not updated may be classified as stale.

In some embodiments, the term "vibrant" or "vibrancy" may refer to a data construct that describes a classification associated with a prediction output comprising an indication of an open-source package or version being likely to be maintained. For example, open-source packages and versions associated with large communities and substantial amounts of activity may be classified as vibrant. As another example, open-source packages and versions that are updated frequently or at regular intervals may be classified as vibrant.

In some embodiments, the term "predictive machine learning model" may refer to a data construct that describes parameters, hyperparameters, and/or defined operations of a machine learning model that is configured to generate a prediction output comprising a rating of staleness or vibrancy for each of one or more open-source packages and versions associated with a prediction input. According to various embodiments of the present disclosure, a predictive machine learning model is trained based on a labeled dataset. In some alternative embodiments, a predictive machine learning model may comprise a semi-supervised machine learning model and may be trained based on a combination of a machine-labeled dataset and a developer-labeled dataset (e.g., in a semi-supervised learning manner). In any case, a predictive machine learning model may be trained with a machine-labeled dataset or a developer-labeled dataset comprising labels indicative of staleness or vibrancy associated with a plurality of training open-source packages and versions.

In some embodiments, the term "training open-source package" may refer to a software module comprising one or more versions that may be used to generate a labeled dataset for training a predictive machine learning model to predict staleness or vibrancy of open-source packages and versions.

In some embodiments, the term "training open-source version" may refer to a specific version of an open-source package that may be used to generate a labeled dataset for training a predictive machine learning model to predict staleness or vibrancy of open-source packages and versions.

In some embodiments, the term "training data object" may refer to a data construct that describes assignments of a given training open-source package and version to a package-basis cluster and a version-basis cluster. A training data object may comprise a package-basis cluster label, a probability of assignment to a package-basis cluster associated with the package-basis cluster label, a version-basis cluster label, and a probability of assignment to a version-basis cluster associated with the version-basis cluster label.

In some embodiments, the term "label" may refer to a data construct that describes descriptions, tags, or identifiers that classify or emphasize features associated with training data objects. According to various embodiments of the present disclosure, labels may be used to generate training data for a predictive machine learning model, such as a machine-labeled dataset or a developer-labeled dataset. Examples of labels that may be used to generate training data for training a predictive machine learning model (e.g., to generate a prediction output comprising a rating of staleness or vibrancy for each of one or more open-source packages and versions) may comprise "vibrant," "stale," or "unlabeled" labels.

In some embodiments, the term "labeled dataset" may refer to a data construct that describes training data objects tagged, associated, or assigned with labels identifying certain characteristics, properties, or classifications of the data.

In some embodiments, the term "developer-labeled dataset" may refer to a data construct that describes training data objects that have been human labeled or labeled based on expert knowledge (e.g., sent to internal software developers for expert review and labeling). A developer-labeled dataset may be used to train and evaluate a predictive machine learning model in combination with a machine-labeled dataset. In some embodiments, a developer-labeled dataset may be generated by selecting a sample (e.g., random) of training open-source packages and versions and labeling the selected sample based on expert input identifying the training open-source packages and versions as "vibrant" or "stale."

In some embodiments, the term "machine-labeled dataset" may refer to a data construct that describes training data objects tagged, associated, or assigned with labels by a machine learning model. A machine-labeled dataset may be used to train a predictive machine learning model. A machine-labeled dataset may be generated by labeling a plurality of training data objects associated with at least a portion of a plurality of training open-source packages and versions based on (i) an assignment of one or more of a plurality of package-basis cluster labels to respective ones of a plurality of package-basis clusters and (ii) an assignment of one or more of a plurality of version-basis cluster labels to respective ones of a plurality of version-basis clusters.

In some embodiments, the term "manually-labeled cluster example" may refer to a data construct that describes examples that reflect clustering assignment made by a human, such as a subject matter expert. Manually-labeled cluster examples may be used to compare against clustering results of unsupervised machine learning model clustering (e.g., for ad-hoc analysis of clustering results) and to adjust unsupervised machine learning clustering algorithms and models. For example, manually-labeled cluster examples may comprise a set of hand-picked packages and versions that either (a) sit near the boundary of where specific packages could be considered "stale" or "vibrant," or (b) are clear examples of staleness/vibrancy. Manually-labeled cluster examples may be independently generated for package-basis clustering and version-basis clustering.

In some embodiments, the term "package-basis feature" may refer to a data construct that describes a package-basis attribute associated with one or more training open-source packages. Package-basis features may be determined based on repository data and used to generate package-basis clusters. Package-basis features based on repository data comprising package release metadata may include, but are not limited to, package version count (number of version associated with a specified package), package initial release gap (time gap between a first version and a second version released for a specified package), package latest release gap (time gap between latest version released for a specified package and a current date), package mean/median release gap (mean/median time gap between all version releases for a specified package), and package latest release gap z-score (z-score of a latest release gap in comparison to all version release gaps for a specified package). Package-basis features based on repository data comprising external repository metrics may include, but are not limited to, stargazers (number (or change since last evaluation) of external repository accounts that have starred (or bookmarked) a specified package, size (quantity (or change since last evaluation) of disk space required by a specified external repository), subscribers (number (or change since last evaluation) of external repository accounts that have subscribed to the specified package), forks count (number (or change since last evaluation) of times a specified package has been forked), network count (number (or change since last evaluation) of repositories in the network of a specified package), open issues (number (or change since last evaluation) of open external repository issues for a specified package), lines (number of line additions and/or deletions in a day/week/month timeframe for a specified package), commits (number of external repository commits in a day/week/month timeframe for a specified package), project age (time gap between a specified package's external repository creation and a current date), has downloads (flag for if a specified package has external repository downloads), has issues (flag for if a specified package has external repository issues), has projects (flag for if a specified package has external repository projects enabled), has wiki (flag for if a specified package has an associated external repository informational "wiki" (e.g., an online hypertext publication collaboratively edited and managed), has pages (flag for if a specified package has external repository pages enabled), has license (flag for if a specified package is licensed), and has description (flag for if a specified package has an external repository description).

In some embodiments, the term "repository data" may refer to a data construct that describes information associated with one or more training open-source packages and versions. For example, repository data may comprise information associated with development activities, such as package release metadata and external repository metrics. Repository data may be retrieved from internal data sources (e.g., within an organization) or external data sources (e.g., public domain). In some embodiments, repository data may comprise data from software development and versioning platforms that may provide community-generated information.

In some embodiments, the term "package-basis cluster" may refer to a data construct that describes a group comprising objects, such as cluster data objects representative of training open-source packages that are similar. For example, cluster data objects within a package-basis cluster may comprise similar package-basis features. According to various embodiments of the present disclosure, a plurality of package-basis clusters may be generated based on one or more package-basis features using a package-basis clustering machine learning model, wherein the plurality of package-basis clusters comprises respective one or more cluster data objects associated with a plurality of training open-source packages. For example, certain package-basis features may be used as criteria for clustering cluster data objects into a plurality of package-basis clusters. Cluster data objects may be grouped into package-basis clusters such that cluster data objects within a given package-basis cluster are more similar to each other compared to cluster data objects in other package-basis clusters. Similarity between cluster data objects may be determined by comparing package-basis features of the cluster data objects. Package-basis features of the cluster data objects may be extracted from repository data and compared to perform package-basis clustering. In some embodiments, a package-basis cluster may be generated with selected ones of a plurality of package-basis features, e.g., determined by performing variable clustering. Cluster data objects may be determined to be similar, with respect to a set of package-basis features, based on a similarity score or a probability of assignment associated with the cluster data objects being above a predetermined threshold. That is, a similarity score or probability of assignment above the predetermined threshold may be representative of the cluster data objects having a set of package-basis features that are substantially shared (or similar) between the cluster data objects. In some embodiments, a package-basis cluster may comprise a plurality of cluster data objects comprising per-cluster set similarity scores or probabilities of assignment, relative to each cluster data object within the cluster, which are of at least a predetermined threshold.

In some embodiments, the term "package-basis clustering machine learning model" may refer to a data construct that describes parameters, hyperparameters, and/or defined operations of a machine learning model that is configured to generate a plurality of package-basis clusters based on one or more package-basis features. According to various embodiments of the present disclosure, a package-basis clustering machine learning model may comprise, for example, a K-means clustering machine learning model configured to generate a plurality of package-basis clusters by determining similarity (e.g., a similarity score or a distance function) between cluster data objects based on a comparison of package-basis features of the cluster data objects and grouping the cluster data objects into a plurality of package-basis clusters based on the determined similarity between the cluster data objects. In other example embodiments, a package-basis clustering machine learning model may comprise a Gaussian mixture machine learning model configured to initialize a plurality of package-basis clusters based on a plurality of Gaussian distributions, determine a probability (of assignment) of the one or more cluster data objects belonging to each of the package-basis clusters, and assigning the one or more cluster data objects to the package-basis clusters based on the determined probabilities.

In some embodiments, the term "package-basis cluster label" may refer to a data construct that describes a label assigned to a package-basis cluster. According to various embodiments of the present disclosure, one or more of a plurality of package-basis cluster labels may be assigned to respective ones of a plurality of package-basis clusters. A package-basis cluster label may be representative of a classification of cluster data objects within a package-basis cluster that may be used by a predictive machine learning model to determine prediction parameters, such as weights. For example, package-basis cluster labels "stale" and "vibrant," representative of vibrance or staleness of open-source packages, may be assigned to respective package-basis clusters. According to various embodiments of the present disclosure, a predictive machine learning model may be trained to predict overall vibrance or staleness of open-source packages with a machine-labeled dataset and/or a developer-labeled dataset comprising training data objects associated with "stale" and "vibrant" package-basis clusters.

In some embodiments, the term "version-basis feature" may refer to a data construct that describes a version-basis attribute associated with one or more training open-source versions (e.g., based on versioning information associated with the one or more training open-source versions). Version-basis features may be determined based on repository data and used to generate version-basis clusters. Version-basis features based on repository data comprising package release metadata may include, but are not limited to, version age (time gap between a specified version's release date and a current date), latest version gap (time gap between a specified version's release date and the most recent version's release date), version number (number of versions that are newer (based on release date) than a specified version), vulnerabilities (number (or change since last evaluation) of direct vulnerabilities associated with a specified version), and dependency count (number (or change since last evaluation) of packages/versions that depend on a specified version).

In some embodiments, the term "version-basis cluster" may refer to a data construct that describes a group comprising cluster data objects, such as cluster data objects representative of training open-source versions that are similar on a version basis. For example, cluster data objects within a version-basis cluster may comprise similar version-basis features. According to various embodiments of the present disclosure, a plurality of version-basis clusters may be generated based on one or more version-basis features. Cluster data objects may be grouped into version-basis clusters such that cluster data objects within a given version-basis cluster are more similar to each other compared to cluster data objects in other version-basis clusters. Similarity between cluster data objects may be determined by comparing version-basis features of the cluster data objects. Version-basis features of the cluster data objects may be extracted from repository data and compared to perform version-basis clustering. Cluster data objects may be determined to be similar, with respect to a set of version-basis features, based on a similarity score or a probability of assignment associated with the cluster data objects being above a predetermined threshold. That is, a similarity score or probability of assignment above the predetermined threshold may be representative of the cluster data objects having a set of version-basis features that are substantially shared (or similar) between the cluster data objects. In some embodiments, a version-basis cluster may comprise a plurality of cluster data objects comprising per-cluster set similarity scores or probabilities of assignment, relative to each cluster data object within the cluster, which are of at least a predetermined threshold.

In some embodiments, the term "version-basis clustering machine learning model" may refer to a data construct that describes parameters, hyperparameters, and/or defined operations of a machine learning model that is configured to generate a plurality of version-basis clusters based on one or more version-basis features. According to various embodiments of the present disclosure, a version-basis clustering machine learning model may comprise, for example, a K-means clustering machine learning model configured to generate a plurality of version-basis clusters by determining similarity (e.g., a similarity score or a distance function) between cluster data objects based on a comparison of version-basis features of the cluster data objects and grouping the cluster data objects into a plurality of version-basis clusters based on the determined similarity between the cluster data objects. In other example embodiments, a version-basis clustering machine learning model may comprise a Gaussian mixture machine learning model configured to initialize a plurality of version-basis clusters based on a plurality of Gaussian distributions, determine a probability (of assignment) of the one or more cluster data objects belonging to each of the version-basis clusters, and assigning the one or more cluster data objects to the version-basis clusters based on the determined probabilities.

In some embodiments, the term "version-basis cluster label" may refer to a data construct that describes a label assigned to a version-basis cluster. According to various embodiments of the present disclosure, one or more of a plurality of version-basis cluster labels may be assigned to respective ones of a plurality of version-basis clusters. A version-basis cluster label may be representative of a classification of cluster data objects within a version-basis cluster that may be used by a predictive machine learning model to determine prediction parameters, such as weights. For example, version-basis cluster labels "stale" and "vibrant," representative of vibrance or staleness of open-source package versions, may be assigned to respective version-basis clusters. According to various embodiments of the present disclosure, a predictive machine learning model may be trained to predict overall vibrance or staleness of open-source package versions with a machine-labeled dataset and/or a developer-labeled dataset comprising training data objects associated with "stale" and "vibrant" version-basis clusters.

IV. OVERVIEW, TECHNICAL IMPROVEMENTS, AND TECHNICAL ADVANTAGES

Various embodiments of the present disclosure make important technical contributions to improving predictive accuracy of predictive machine learning models by clustering and machine-labeling of training datasets based on different context granularities. This approach improves training speed and training efficiency of predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

For example, various embodiments of the present disclosure improve predictive accuracy of predictive machine learning models by clustering and labeling training data with respect to different context granularities. As described herein, feature engineering used to select features from public data for training a predictive machine learning model to predict staleness or vibrancy of open-source packages and versions, which don't follow a strict framework or a clear development pattern as commercial software, is challenging and not easily performed by merely relying on one or more indicators. In particular, existing data about open-source packages, such as from repository data is particularly extensive and nuanced.

However, in accordance with various embodiments of the present disclosure, a predictive machine learning model may be trained with at least a machine-labeled training dataset based on package and version-based variables extracted from repository data to predict whether open-source packages and versions are stale or vibrant. Staleness and vibrancy may comprise classifications indicative of whether open-source packages and versions are likely to be maintained or supported. The disclosed techniques enable application management systems to identify computing systems that are executing undermaintained, unsupported, or deprecated open-source packages and versions and to facilitate determination of actions that can be taken to update or replace such open-source packages and versions. Accordingly, open-source packages and versions that should be reviewed and potentially revised to comply with desired operational and coding practices can be identified. The techniques described herein may also provide intervention to determine open-source packages and versions that lack support or maintenance and potential vulnerabilities associated thereof.

V. EXAMPLE SYSTEM OPERATIONS

As indicated, various embodiments of the present disclosure make important technical contributions to improving predictive accuracy of predictive machine learning models by clustering and machine-labeling of training datasets based on different context granularities. This approach improves training speed and training efficiency of predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

Figure 4:
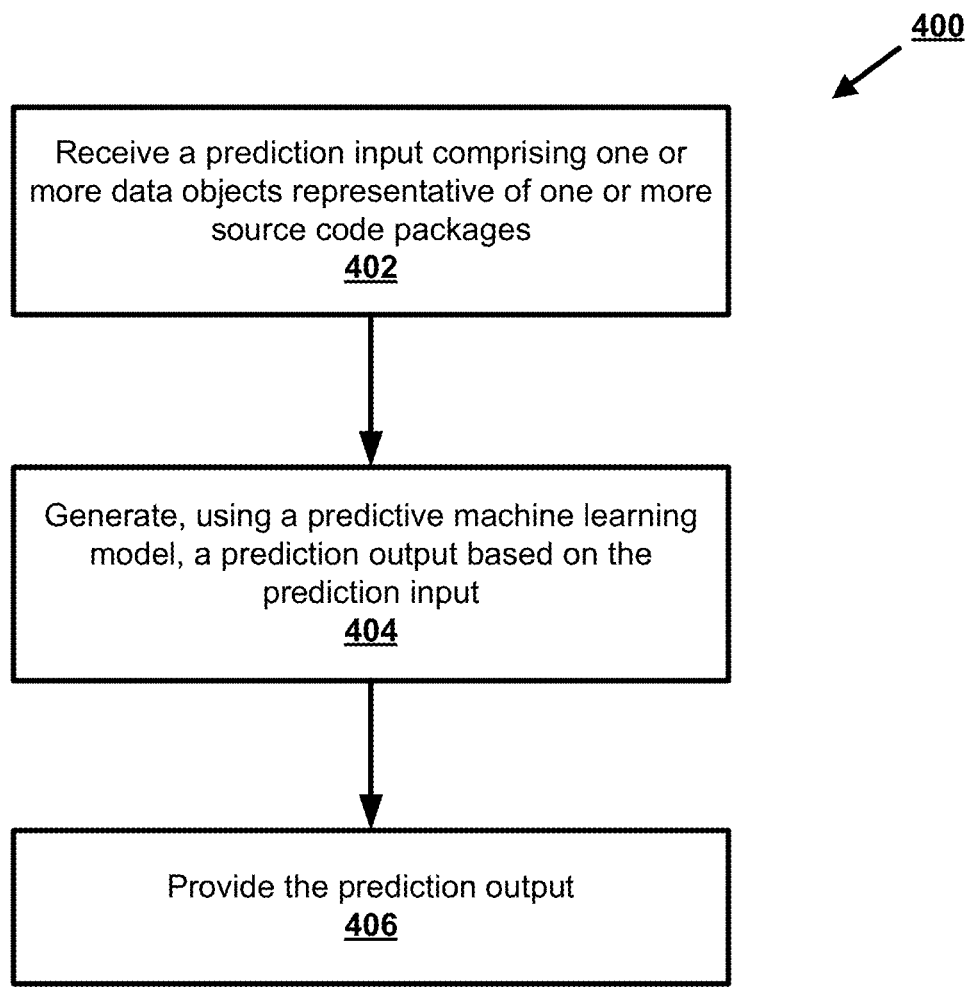
FIG. 4 is a flowchart diagram of an example process for performing predictive operations on a prediction input in accordance with some embodiments of the present disclosure.

FIG. 4 is a flowchart diagram of an example process 400 for performing predictive operations on a prediction input comprising an identification of one or more open-source packages and versions. In some embodiments, via the various steps/operations of the process 400, the predictive data analysis computing entity 106 can use a predictive machine learning model to generate a prediction output indicative of staleness or vibrancy of the one or more open-source packages and versions associated with the prediction input.

In some embodiments, the process 400 begins at step/operation 402 when the predictive data analysis computing entity 106 receives a prediction input comprising an identification of one or more open-source packages and versions. For example, the prediction input may analyze one or more computing systems and identify one or more open-source packages and versions used or executed by the one or more systems computing systems.

In some embodiments, a prediction input describes a data input that can be received and processed by a predictive machine learning model. A predictive machine learning model may generate a prediction output based on a prediction input. According to various embodiments of the present disclosure, a prediction input comprises an identification of one or more open-source packages and versions. The open-source packages and versions may comprise source code written in programming languages, such as Java, JavaScript, .NET, C, C#, C++, Python, Visual Basic, SQL, or PHP. The identification of the one or more open-source packages and versions may comprise an identification of one or more libraries and versioning associated with the one or more libraries or an entirety of the one or more open-source packages and versions.

As described herein, in accordance with various embodiments of the present disclosure, a predictive machine learning model may be trained with at least a machine-labeled training dataset based on package and version-based variables extracted from repository data to predict whether open-source packages and versions are stale or vibrant. Staleness and vibrancy may comprise classifications indicative of whether open-source packages and versions are likely to be maintained or supported. The disclosed techniques enable application management systems to identify computing systems that are executing undermaintained, unsupported, or deprecated open-source packages and versions and to facilitate determination of actions that can be taken to update or replace such open-source packages and versions. Accordingly, open-source packages and versions that should be reviewed and potentially revised to comply with desired operational and coding practices can be identified. The techniques described herein may also provide intervention to determine open-source packages and versions that lack support or maintenance and potential vulnerabilities associated thereof.

In some embodiments, at step/operation 404, the predictive data analysis computing entity 106 generates, using a predictive machine learning model, a prediction output based on the prediction input. According to various embodiments of the present disclosure, the prediction output generated by the predictive machine learning model comprises respective one or more ratings of staleness or vibrancy of the one or more open-source packages and versions associated with the prediction input. In some embodiments, the prediction output may also comprise respective one or more probabilities of staleness or vibrancy associated with the one or more open-source packages and versions.

In some embodiments, staleness describes a classification associated with a prediction output representative of open-source packages and versions being unlikely to be maintained, or likely being end of life, undermaintained, unsupported, or deprecated. For example, open-source packages and versions associated with small communities and modest amounts of activity may be classified as stale. As another example, open-source packages and versions that are not updated may be classified as stale.

In some embodiments, vibrancy describes a classification associated with a prediction output representative of open-source packages and versions being likely to be maintained. For example, open-source packages and versions associated with large communities and substantial amounts of activity may be classified as vibrant. As another example, open-source packages and versions that are updated frequently or at regular intervals may be classified as vibrant.

In some embodiments, a predictive machine learning model describes parameters, hyperparameters, and/or defined operations of a machine learning model that is configured to generate a prediction output comprising a rating of staleness or vibrancy for each of one or more open-source packages and versions associated with a prediction input. According to various embodiments of the present disclosure, a predictive machine learning model is trained based on a labeled dataset. In some alternative embodiments, a predictive machine learning model may comprise a semi-supervised machine learning model and may be trained based on a combination of a machine-labeled dataset and a developer-labeled dataset (e.g., in a semi-supervised learning manner). In any case, a predictive machine learning model may be trained with a machine-labeled dataset and/or a developer-labeled dataset comprising labels indicative of staleness or vibrancy of a plurality of training open-source packages and versions.

In some embodiments, a labeled dataset may refer to a data construct that describes training data objects tagged, associated, or assigned with labels identifying certain characteristics, properties, or classifications of the data.

In some embodiments, a developer-labeled dataset describes training data objects that have been human labeled or labeled based on expert knowledge (e.g., sent to internal software developers for expert review and labeling). A developer-labeled dataset may be used to train and evaluate a predictive machine learning model in combination with a machine-labeled dataset. In some embodiments, a developer-labeled dataset may be generated by selecting a sample (e.g., random) of training open-source packages and versions and labeling the selected sample based on expert input identifying the training open-source packages and versions as "vibrant" or "stale."

In some embodiments, a machine-labeled dataset describes training data objects tagged, associated, or assigned with labels by a machine learning model. A machine-labeled dataset may be used to train a predictive machine learning model. A machine-labeled dataset may be generated by labeling a plurality of training data objects associated with at least a portion of a plurality of training open-source packages and versions based on (i) an assignment of one or more of a plurality of package-basis cluster labels to respective ones of a plurality of package-basis clusters and (ii) an assignment of one or more of a plurality of version-basis cluster labels to respective ones of a plurality of version-basis clusters.

Generation of a labeled dataset is described in further detail with reference to the description of FIG. 5.

Figure 5:
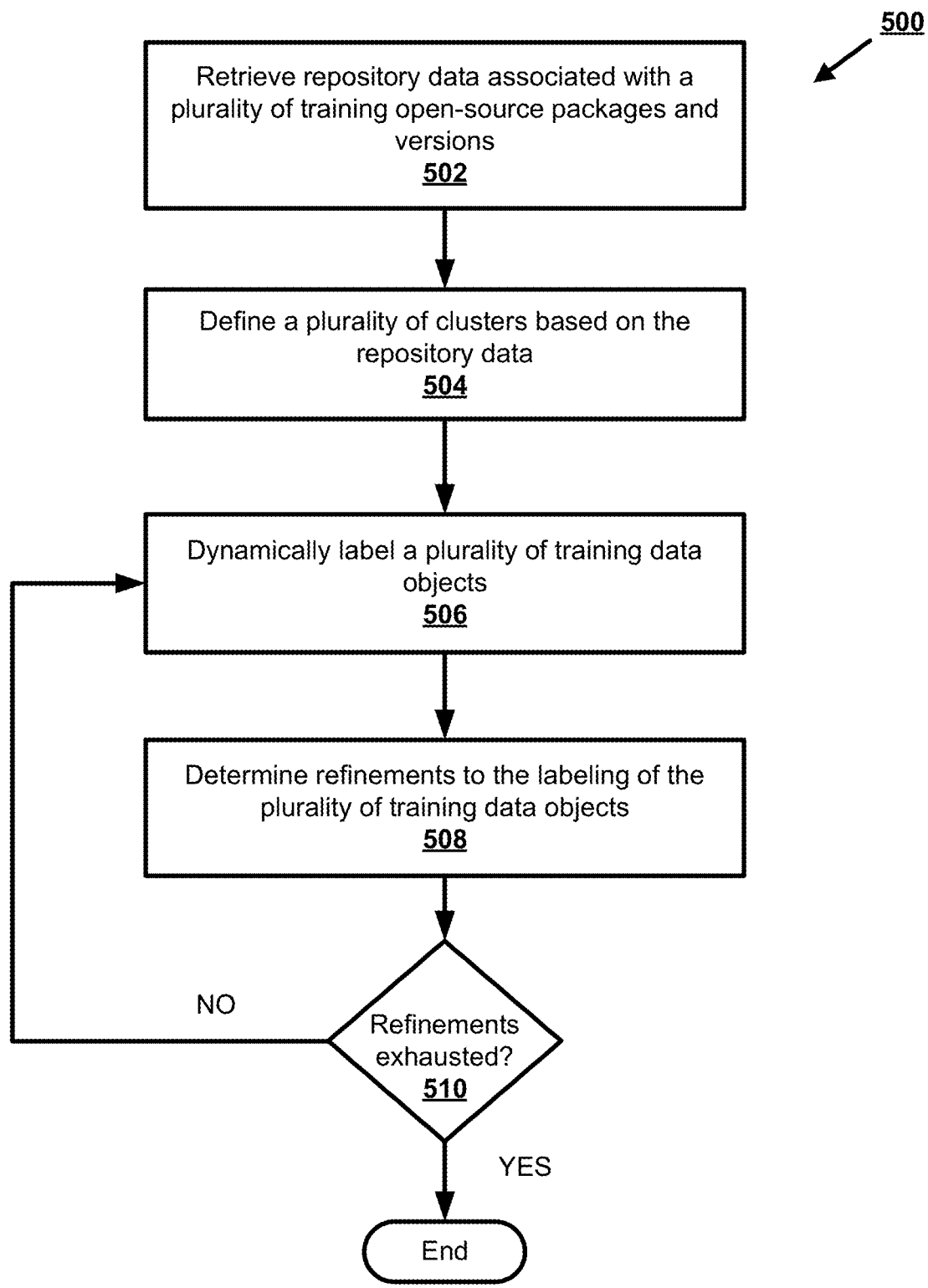
FIG. 5 is a flowchart diagram of an example process for generating a labeled dataset in accordance with some embodiments of the present disclosure.

FIG. 5 is a flowchart diagram of an example process 500 for generating a labeled dataset. In some embodiments, the process 500 begins at step/operation 502 when the predictive data analysis computing entity 106 retrieves repository data associated with a plurality of training open-source packages and versions. According to various embodiments of the present disclosure, repository data may be used to gather features of training open-source packages and versions. In some embodiments, repository data describes information associated with one or more training open-source packages and versions. For example, repository data may comprise information associated with development activities, such as package release metadata and external repository metrics. Repository data may be retrieved from internal data sources (e.g., within an organization) or external data sources (e.g., public domain). In some embodiments, repository data may comprise data from software development and versioning platforms that may provide community-generated information.

In some embodiments, retrieving the repository data may comprise identifying open-source packages and versions of interest (e.g., related to packages and versions used, or desired for use). The open-source packages and versions of interest may be identified by names and/or numeric identification. For example, a group identifier (ID) (e.g., of package publisher), a package ID, and a version ID may be determined for each training open-source package and version and used to retrieve repository data.

In some embodiments, a package ID may be used to retrieve package release metadata for all versions of a specified open-source package. As such, a complete view of release cadence may be obtained for each specified package allowing for package-basis and version-basis features to be generated.

In some embodiments, a programmatic search (e.g., using a search engine) comprising a search query based on group ID and package ID may be performed to predict an external repository universal resource link (URL) for retrieving external repository metrics of a specific package. A URL mapping may be predicted for each training open-source package by conducting a string distance comparison of each URL from top search results provided by the programmatic search against the search query (e.g., group ID+package ID). The URL with the highest similarity score may be selected for external repository mapping. External repository mapping is described in further detail with respect to the description of FIG. 6.

Figure 6:
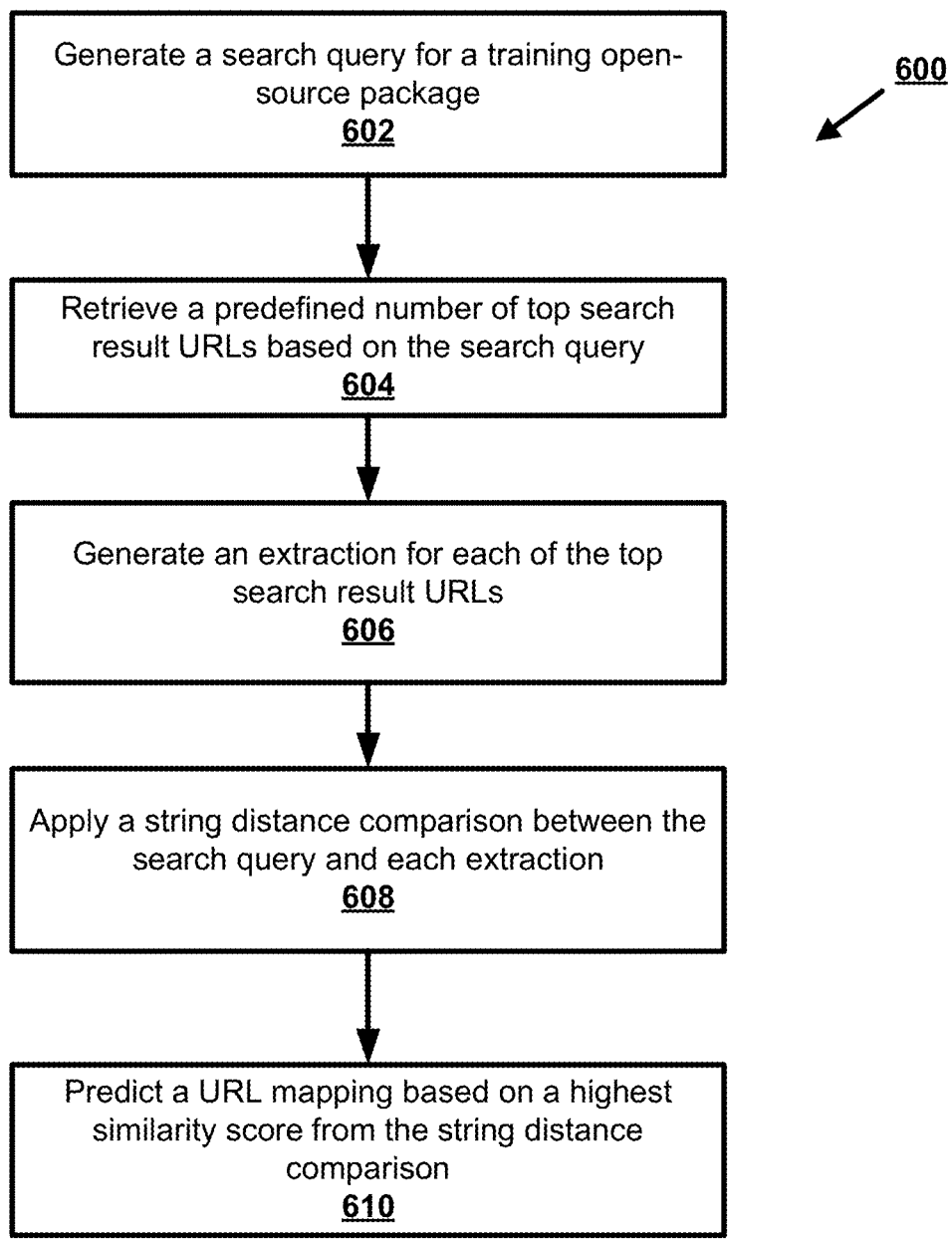
FIG. 6 is a flowchart diagram of an example process for mapping training open-source packages to external repositories in accordance with some embodiments of the present disclosure.

FIG. 6 is a flowchart diagram of an example process 600 for mapping training open-source packages to external repositories. External repository metrics data of open-source packages may be accessible via, for example, the Internet. As such, URLs to the external repositories may be identified and used to retrieve external repository metrics data from the external repositories. Accordingly, a specific URL mapping may be created for each training open-source package to retrieve external repository metrics data for the training open-source package.

In some embodiments, the process 600 begins at step/operation 602 when the predictive data analysis computing entity 106 generates a search query for a training open-source package. The search query may be used to identify a URL to external repository metrics data associated with the training open-source package from an external repository. The search query may comprise a search string comprising an identification of the training open-source package. For example, the search query may be generated by concatenating a group ID with a package ID associated with the training open-source package.

In some embodiments, at step/operation 604, the predictive data analysis computing entity 106 retrieves a predefined number of top search result URLs based on the search query. The search query may be submitted to a search engine configured to retrieve one or more search results based on the search query. Each search result may comprise a URL (search result URL) that can be used to navigate to a webpage or website. According to various embodiments of the present disclosure, URLs from a predefined number (e.g., three) of top search results are retrieved. From the predefined number of top search result URLs, one may be identified and selected as a URL for retrieving external repository metrics data for the training open-source package.

In some embodiments, at step/operation 606, the predictive data analysis computing entity 106 generates an extraction for each of the top search result URLs. Extractions generated from the top search result URLs may be used to determine which one of the top search result URLs should be assigned for URL mapping to the training open-source package. An extraction may comprise a concatenation of portions, such as a file path or directory, extracted from a top search result URL. According to various embodiments of the present disclosure, a URL that contains a file path or directory that matches an external repository name and organization associated with a training open-source package is likely a link to external repository metrics data on an external repository for the training open-source package. As such, extractions generated from the top search result URLs may capture portions of the top search result URLs that can be used to determine which of the top search result URLs may be used to retrieve external repository metrics data of the training open-source package.

In some embodiments, at step/operation 608, the predictive data analysis computing entity 106 applies a string distance comparison between the search query and each extraction. The string distance comparison may comprise determining an amount of operations required to transform the search query into each extraction. Various techniques may be used to determine a string distance, such as Jaro-Winkler similarity, Levenshtein distance, longest common subsequence, or Damerau-Levenshtein distance.

In some embodiments, at step/operation 610, the predictive data analysis computing entity 106 predicts a URL mapping based on a highest similarity score from the string distance comparison. A top search result URL comprising a best (e.g., highest similarity score) extraction may be used to retrieve external repository metrics data for the training open-source package.

Process 600 may be performed for each training open-source package and may be repeated for each training open-source package at a specific cadence, periodically, to maintain up-to-date URL mappings. For example, if any search results with better string distance scores are identified, a corresponding URL mapping may be updated with a new URL.

Referring back to FIG. 5, in some embodiments, at step/operation 504, the predictive data analysis computing entity 106 defines a plurality of clusters, based on the repository data. The plurality of clusters may comprise package-basis clusters and version-basis clusters. Defining clusters of the plurality of cluster data objects may comprise determining features, such as package-basis features and version-basis features, associated with the plurality of training open-source packages and versions, clustering the cluster data objects, e.g., into package-basis clusters and version-basis clusters, based on the determined features, and assigning cluster labels to clusters (e.g., package-basis clusters and version-basis clusters) of the cluster data objects. Unsupervised machine learning algorithms and models may be used to determine patterns in the repository data that are indicative of vibrancy or staleness associated with the plurality of training open-source packages and versions. Additionally, missing or lack of data associated with the plurality of training open-source packages and versions may be identified as indicators of staleness.

In some embodiments, a package-basis cluster describes a group comprising objects, such as cluster data objects representative of training open-source packages, which are similar on a package basis. For example, cluster data objects within a package-basis cluster may comprise similar package-basis features. Certain package-basis features may be used as criteria for clustering cluster data objects into a plurality of package-basis clusters. Cluster data objects may be grouped into package-basis clusters such that cluster data objects within a given package-basis cluster are more similar to each other compared to cluster data objects in other package-basis clusters. Similarity between cluster data objects may be determined by comparing package-basis features of the cluster data objects. Package-basis features of the cluster data objects may be extracted from repository data and compared to perform package-basis clustering. In some embodiments, a package-basis cluster may be generated with selected ones of a plurality of package-basis features, e.g., determined by performing variable clustering.

In some embodiments, a version-basis cluster describes a group comprising cluster data objects, such as cluster data objects representative of training open-source versions, which are similar on a version basis. For example, cluster data objects within a version-basis cluster may comprise similar version-basis features. Cluster data objects may be grouped into version-basis clusters such that cluster data objects within a given version-basis cluster are more similar to each other compared to cluster data objects in other version-basis clusters. Similarity between cluster data objects may be determined by comparing version-basis features of the cluster data objects. Version-basis features of the cluster data objects may be extracted from repository data and compared to perform version-basis clustering.

In some embodiments, the plurality of clusters may be confirmed by comparing different feature median among the plurality of clusters, building a tree-based model and using a SHapley Additive explanation (SHAP) value importance plot to observe feature importance ranking, comparing the plurality of clusters with an external top/popular package list to determine whether cluster members fall into clusters differently, compare the plurality of clusters with known "stale" open-source packages and versions and known "vibrant" open-source packages and versions, or compare the plurality of clusters with expert knowledge, such as manually-labeled cluster examples.

In some embodiments, a manually-labeled cluster example describes examples that reflect clustering assignment made by a human, such as a subject matter expert. Manually-labeled cluster examples may be used to compare against clustering results of unsupervised machine learning model clustering (e.g., for ad-hoc analysis of clustering results) and to adjust unsupervised machine learning clustering algorithms and models. For example, manually-labeled cluster examples may comprise a set of hand-picked packages and versions that either (a) sit near the boundary of where specific packages could be considered "stale" or "vibrant," or (b) are clear examples of staleness/vibrancy. Manually-labeled cluster examples may be independently generated for package-basis clustering and version-basis clustering.

Defining of the plurality of clusters is described in further detail with reference to the descriptions of FIG. 7 and FIG. 9.

In some embodiments, at step/operation 506, the predictive data analysis computing entity 106 dynamically labels a plurality of training data objects, associated with at least a portion of the plurality of training open-source packages and versions, based on the plurality of clusters to generate a machine-labeled dataset. Dynamically labeling the plurality of training data objects may comprise assigning a label indicative of staleness/vibrancy at a combined package and version level to each of the plurality of training data objects.

In some embodiments, a label describes descriptions, tags, or identifiers that classify or emphasize features associated with training data objects. According to various embodiments of the present disclosure, labels may be used to generate training data for a predictive machine learning model, such as a machine-labeled dataset or a developer-labeled dataset. Examples of labels that may be used to generate training data for training a predictive machine learning model (e.g., to generate a prediction output comprising a rating of staleness or vibrancy for each of one or more open-source packages and versions) may comprise "vibrant," "stale," or "unlabeled" labels.

In some embodiments, a training data object describes assignments of a given training open-source package and version to a package-basis cluster and a version-basis cluster. A training data object may comprise a package-basis cluster label, a probability of assignment to a package-basis cluster associated with the package-basis cluster label, a version-basis cluster label, and a probability of assignment to a version-basis cluster associated with the version-basis cluster label.

According to various embodiments of the present disclosure, a training data object may be labeled based on its probability of assignment to one of a plurality of package-basis clusters and its probability of assignment to one of a plurality of version-basis clusters. That is, a training data object may be labeled as one of "vibrant," "stale," or "unlabeled" based on its probability of membership to certain package-basis clusters and version-basis clusters. For example, a first training data object comprising a combined probability of assignment to a "vibrant" package-basis cluster and a "vibrant" version-basis cluster that exceeds a first probability threshold may be labeled as "vibrant." Otherwise, if the combined probability of assignment is below the first probability threshold, the first training data object may be labeled as "unlabeled."

Whereas a second training data comprising a combined probability of assignment to a "stale" package-basis cluster and a "stale" version-basis cluster that exceeds a second probability threshold may be labeled as "stale." Otherwise, if the combined probability of assignment is below the second probability threshold, the second training data object may be labeled as "unlabeled."

A third training data comprising a combined probability of assignment to the "vibrant" package-basis cluster and the "stale" version-basis cluster that exceeds a third probability threshold may also be labeled as "stale" because a vibrant package can still contain a stale version. Otherwise, if the combined probability of assignment is below the third probability threshold, the third training data object may be labeled as "unlabeled."

Furthermore, any training data object comprising an assignment to the "stale" package-basis cluster and the "vibrant" version-basis cluster may be labeled as "unlabeled" because in certain instances, open-source package versioning may appear vibrant based on release date while with very few development activities or interests, and hence, it actually may still be considered as stale. For example, a latest version doesn't necessarily indicate a best version and may actually indicate instability or lack of support.

The dynamic labeling of the plurality of training data objects allows for adjustment or corrections to the labels assigned based on probability of assignment.

In some embodiments, at step/operation 508, the predictive data analysis computing entity 106 determines refinements to the labeling of the plurality of training data objects. Refining the labeling of the plurality of training data objects may be based on one or more developer-labeled datasets. The one or more developer-labeled datasets may take precedence over machine-labeled datasets. As such, any one of the plurality of training data objects that overlap with training data objects from the one or more developer-labeled datasets may be replaced or corrected.

Refining the labeling of the plurality of training data objects may further comprise defining a hyperparameter search grid and fitting a self-training classifier. For example, a gradient boosting machine learning model may be used to iterate across a full cartesian grid search with values for learning rate, maximum depth, and number of estimators, and recording the results of each iteration. In some embodiments, refining the labeling of the plurality of training data objects may further comprise assessing the labeling of the plurality of training data objects based on evaluation metrics using a holdout set of developer-labeled examples. The evaluation metrics may comprise measures used to assess accuracy or consistency of the labeling of the plurality of training data objects compared with the holdout set of developer-labeled examples.

In some embodiments, at step/operation 510, the predictive data analysis computing entity 106 determines whether refinements have been exhausted. Until there are no further improvements in refining the labeling of the plurality of training data objects. For example, the predictive data analysis computing entity 106 may determine that a hyperparameter search grid has not been exhausted and additional iterations may be performed. Determining whether refinements have been exhausted may also comprise determining whether evaluation metrics have peaked or plateaued.

In some embodiments, if refinements have not been exhausted (e.g., refinements to the labeling of the plurality of training data objects can be made), returning to step/operation 506, the predictive data analysis computing entity 106 continues to dynamically label the plurality of training data objects based on the determined refinements. Otherwise, if refinements have been exhausted, package-basis clustering is completed.

Figure 7:
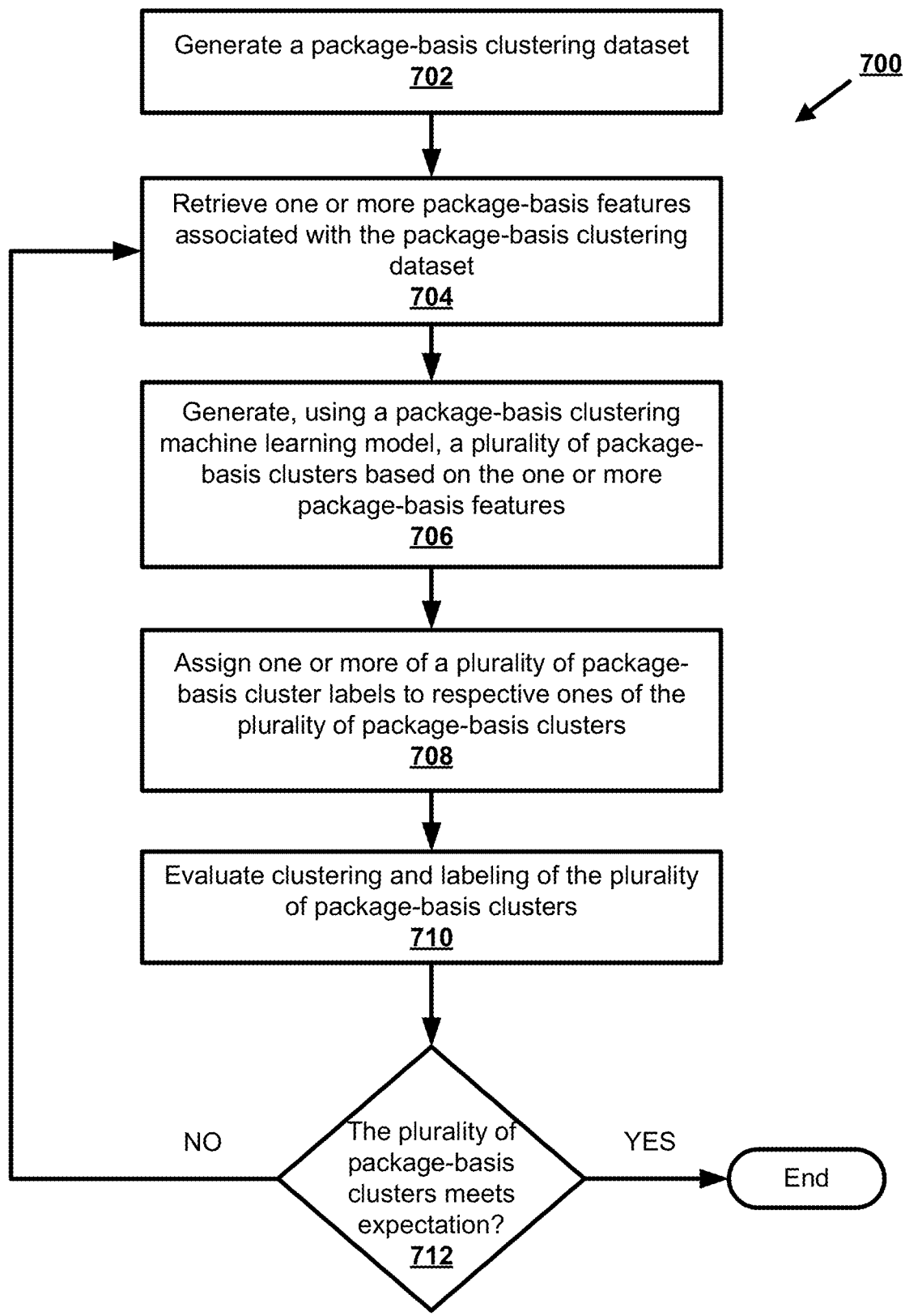
FIG. 7 is a flowchart diagram of an example process for defining package-basis clusters in accordance with some embodiments of the present disclosure.

FIG. 7 is a flowchart diagram of an example process 700 for defining package-basis clusters. In some embodiments, the process 700 begins at step/operation 702 when the predictive data analysis computing entity 106 generates a package-basis clustering dataset. The package-basis clustering dataset may comprise a plurality of training open-source packages. In some embodiments, a training open-source package describes a software module comprising one or more versions that may be used to generate a labeled dataset for training a predictive machine learning model to predict staleness or vibrancy of open-source packages and versions.

In some embodiments, at step/operation 704, the predictive data analysis computing entity 106 retrieves one or more package-basis features associated with the package-basis clustering dataset. The one or more package-basis features may be retrieved based on analysis of a correlation matrix, variable clustering, SHAP values, or manual adjustment based on domain knowledge.

In some embodiments, a package-basis feature may describe a package-basis attribute associated with one or more training open-source packages. Package-basis features may be determined based on repository data and used to generate package-basis clusters. Package-basis features based on repository data comprising package release metadata may include, but are not limited to, package version count (number of version associated with a specified package), package initial release gap (time gap between a first version and a second version released for a specified package), package latest release gap (time gap between latest version released for a specified package and a current date), package mean/median release gap (mean/median time gap between all version releases for a specified package), and package latest release gap z-score (z-score of a latest release gap in comparison to all version release gaps for a specified package). Package-basis features based on repository data comprising external repository metrics may include, but are not limited to, stargazers (number (or change since last evaluation) of external repository accounts that have starred (or bookmarked) a specified package, size (quantity (or change since last evaluation) of disk space required by a specified external repository), subscribers (number (or change since last evaluation) of external repository accounts that have subscribed to the specified package), forks count (number (or change since last evaluation) of times a specified package has been forked), network count (number (or change since last evaluation) of repositories in the network of a specified package), open issues (number (or change since last evaluation) of open external repository issues for a specified package), lines (number of line additions and/or deletions in a day/week/month timeframe for a specified package), commits (number of external repository commits in a day/week/month timeframe for a specified package), project age (time gap between a specified package's external repository creation and a current date), has downloads (flag for if a specified package has external repository downloads), has issues (flag for if a specified package has external repository issues), has projects (flag for if a specified package has external repository projects enabled), has wiki (flag for if a specified package has an associated external repository informational "wiki" (e.g., an online hypertext publication collaboratively edited and managed), has pages (flag for if a specified package has external repository pages enabled), has license (flag for if a specified package is licensed), and has description (flag for if a specified package has an external repository description).

Package-basis features may be used to generate package-basis clusters. In some embodiments, package-basis features may be pre-processed or prepared for input to a package-basis clustering machine learning model to perform package-basis clustering. For example, package-basis features may be normalized, standardized, or logarithmically transformed such that the package-basis features are a same scale. Multicollinearities among the package-basis features may also be removed through variable clustering and optionally, with manual review. Dimensionality reduction may also be performed on the package-basis features to improve accuracy (of the package-basis clustering machine learning model) by, for example, performing principal component analysis to reduce model complexity and overfitting to training data.

In some embodiments, an operational example of variables comprising package-basis features is depicted in FIG. 8. As depicted in FIG. 8, in some embodiments, package-basis feature variables may be selected and divided into distinct clusters to perform variable clustering. Variable clustering may remove collinearity, decrease variable redundancy, and help reveal the underlying structure of the package-basis features. Moreover, as further depicted in FIG. 8, RS_Ratio may be determined for selecting one or more package-basis features from a package-basis cluster. For example, higher RS_Ratio may be indicative of a package-basis feature with a higher correlation with its own cluster (RS_Own) and a lower correlation with a next cluster (RS_NC).

Referring back to FIG. 7, in some embodiments, at step/operation 706, the predictive data analysis computing entity 106 generates, using a package-basis clustering machine learning model, a plurality of package-basis clusters based on the one or more package-basis features. The plurality of package-basis clusters may comprise respective one or more cluster data objects associated with the plurality of training open-source packages.

Cluster data objects may be determined to be similar, with respect to a set of package-basis features, based on a similarity score or a probability associated with the cluster data objects being above a predetermined threshold. That is, a similarity score or probability above the predetermined threshold may be representative of the cluster data objects having a set of package-basis features that are substantially shared (or similar) between the cluster data objects. Accordingly, a package-basis cluster may comprise a plurality of cluster data objects comprising per-cluster set similarity scores or probabilities, relative to each cluster data object within the cluster, which are of at least a predetermined threshold. In some embodiments, a plurality of package-basis clusters may be generated by, for each of the plurality of cluster data objects, (i) determining a probability of the cluster data object belonging to each of a plurality of package-basis clusters and (ii) assigning the cluster data object to one of the plurality of package-basis clusters based on the determined probabilities.

In some embodiments, a package-basis clustering machine learning model describes parameters, hyperparameters, and/or defined operations of a machine learning model that is configured to generate a plurality of package-basis clusters based on one or more package-basis features. According to various embodiments of the present disclosure, a package-basis clustering machine learning model may comprise, for example, a K-means clustering machine learning model configured to generate a plurality of package-basis clusters by determining similarity (e.g., a similarity score or a distance function) between cluster data objects based on a comparison of package-basis features of the cluster data objects and grouping the cluster data objects into a plurality of package-basis clusters based on the determined similarity between the cluster data objects. In other example embodiments, a package-basis clustering machine learning model may comprise a Gaussian mixture machine learning model configured to initialize a plurality of package-basis clusters based on a plurality of Gaussian distributions, determine a probability of the one or more cluster data objects belonging to each of the package-basis clusters, and assigning the one or more cluster data objects to the package-basis clusters based on the determined probabilities.

In some embodiments, at step/operation 708, the predictive data analysis computing entity 106 assigns one or more of a plurality of package-basis cluster labels to respective ones of the plurality of package-basis clusters. Package-basis cluster labels may be assigned to package-basis clusters based on an analysis of distributions of key features in relation to each cluster.

In some embodiments, a package-basis cluster label describes a label assigned to a package-basis cluster. A package-basis cluster label may be representative of a classification of cluster data objects within a package-basis cluster that may be used by a predictive machine learning model to determine prediction parameters, such as weights. For example, package-basis cluster labels "stale" and "vibrant," representative of vibrance or staleness of open-source packages, may be assigned to respective package-basis clusters. According to various embodiments of the present disclosure, a predictive machine learning model may be trained to predict overall vibrance or staleness of open-source packages with a machine-labeled dataset and/or a developer-labeled dataset comprising training data objects associated with "stale" and "vibrant" package-basis clusters.

In some embodiments, at step/operation 710, the predictive data analysis computing entity 106 evaluates clustering and labeling of the plurality of package-basis clusters. Evaluating the clustering and labeling of the plurality of package-basis clusters may comprise analyzing partial dependence plots, computing one or more silhouette scores, and comparing clustering results against a set of manually-labeled package examples.

In some embodiments, at step/operation 712, the predictive data analysis computing entity 106 determines whether the plurality of package-basis clusters meets an expectation. The expectation may be based on the package-basis clustering directionally matching one or more of partial dependence plots, silhouette scores reaching a local minimum, or manually-labeled cluster examples reflecting clustering assignment of the plurality of package-basis clusters. In some embodiments, if the plurality of package-basis clusters does not meet the expectation, returning to step/operation 704, the predictive data analysis computing entity 106 retrieves additional one or more package-basis features associated with the package-basis clustering dataset. Otherwise, if the package-basis clusters meets the expectation, package-basis clustering is completed.

Figure 9:
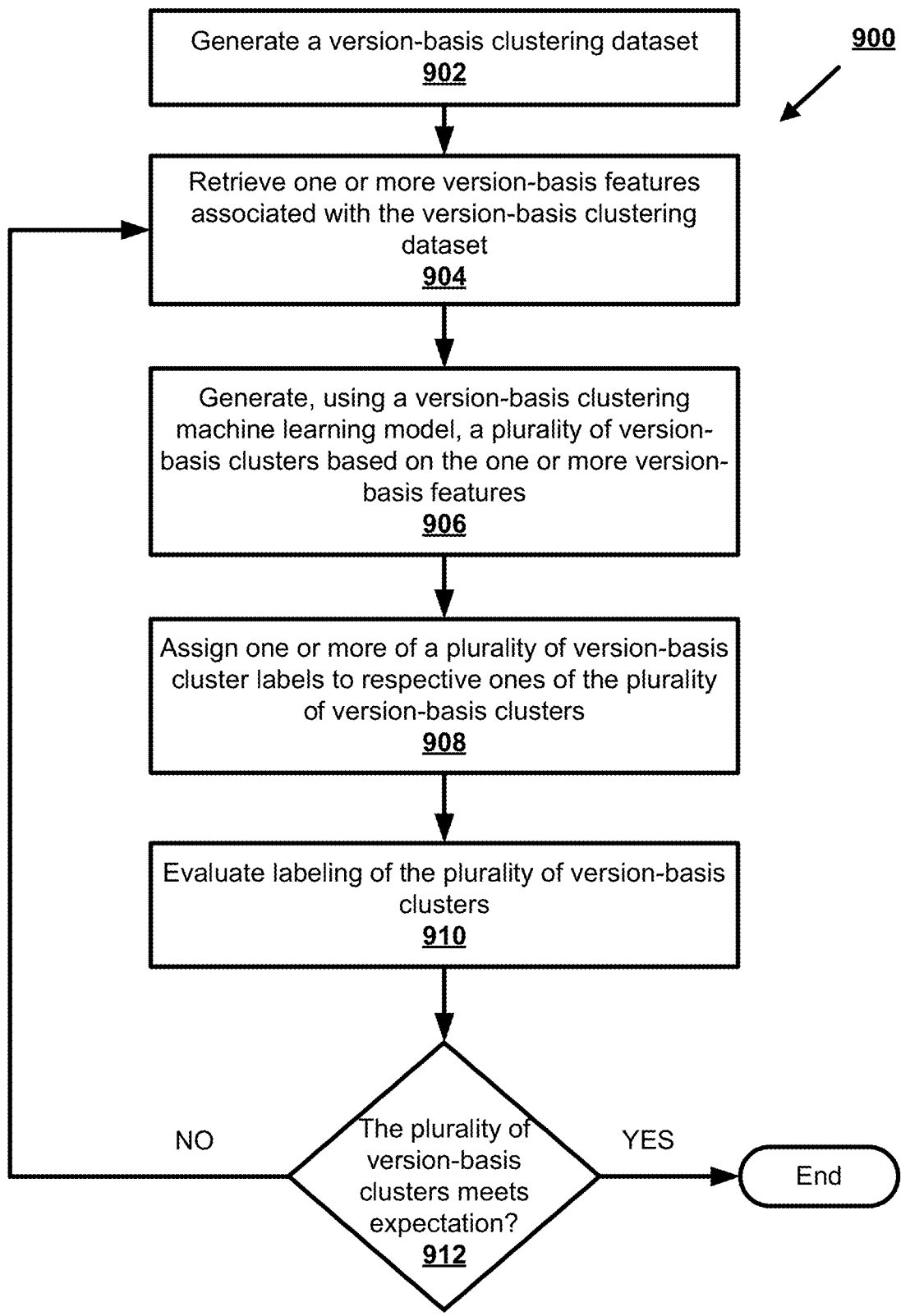
FIG. 9 is a flowchart diagram of an example process for defining version-basis clusters in accordance with some embodiments of the present disclosure.

FIG. 9 is a flowchart diagram of an example process 900 for defining version-basis clusters. In some embodiments, the process 900 begins at step/operation 902 when the predictive data analysis computing entity 106 generates a version-basis clustering dataset. The version-basis clustering dataset may comprise a plurality of training open-source versions. In some embodiments, a training open-source version describes a specific version of an open-source package that may be used to generate a labeled dataset for training a predictive machine learning model to predict staleness or vibrancy of open-source packages and versions.

In some embodiments, at step/operation 904, the predictive data analysis computing entity 106 retrieves one or more version-basis features associated with the version-basis clustering dataset. The one or more version-basis features may be retrieved based on analysis of a correlation matrix, variable clustering, SHAP values, or manual adjustment based on domain knowledge.

In some embodiments, a version-basis feature describes a version-basis attribute associated with one or more training open-source versions (e.g., based on versioning information associated with the one or more training open-source versions). Version-basis features may be determined based on repository data and used to generate version-basis clusters. Version-basis features based on repository data comprising package release metadata may include, but are not limited to, version age (time gap between a specified version's release date and a current date), latest version gap (time gap between a specified version's release date and the most recent version's release date), version number (number of versions that are newer (based on release date) than a specified version), vulnerabilities (number (or change since last evaluation) of direct vulnerabilities associated with a specified version), and dependency count (number (or change since last evaluation) of packages/versions that depend on a specified version).

Figure 10:
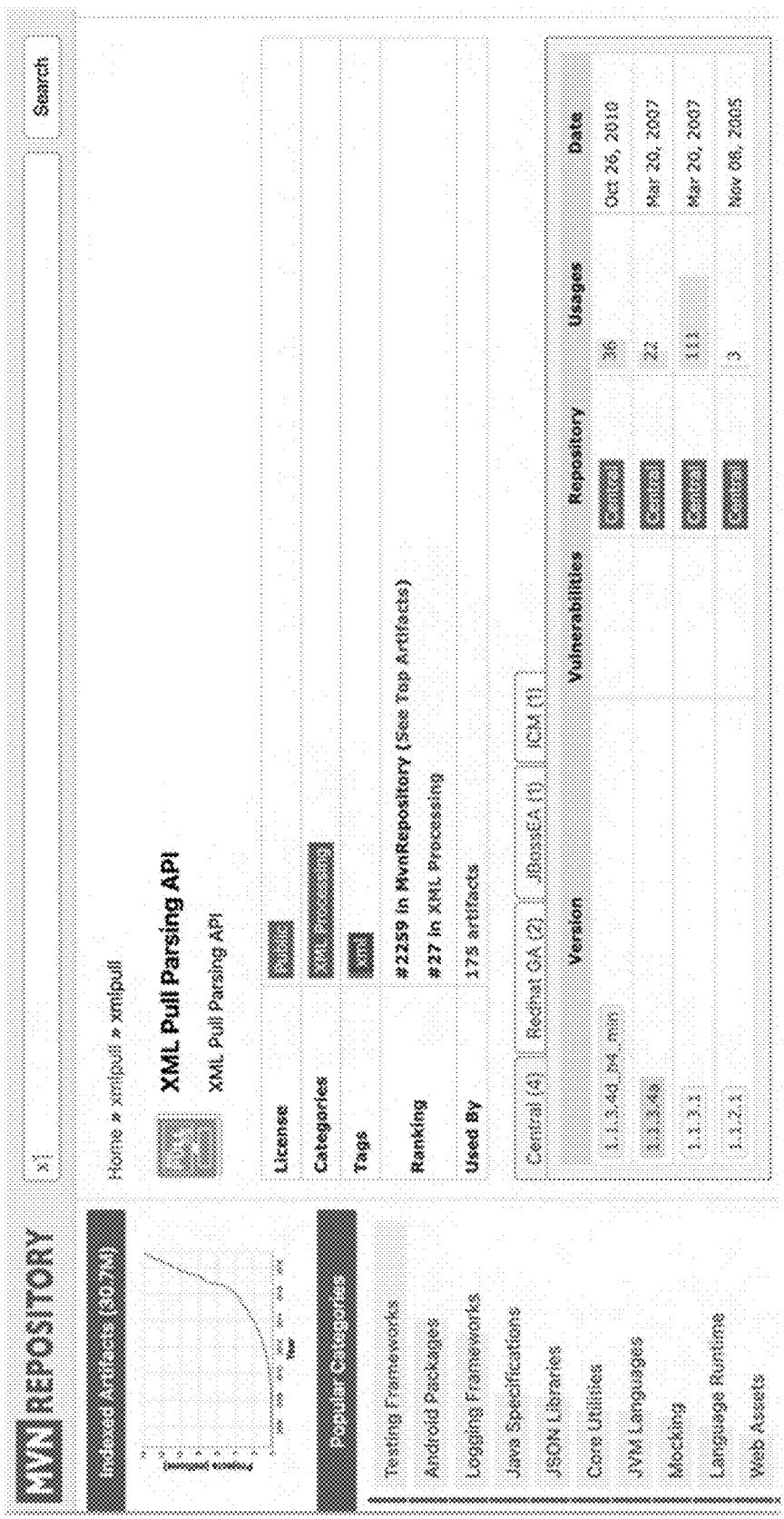
FIG. 10 is an operational example of repository data comprising version-basis features in accordance with some embodiments discussed herein.

In some embodiments, an operational example of repository data comprising version-basis features is depicted in FIG. 10. As depicted in FIG. 10, in some embodiments, repository data comprises information, such as version numbers and dates, release data, usage, deprecation, and activities.

Version-basis features may be used to generate version-basis clusters. In some embodiments, similar to the aforementioned pre-processing of package-basis features, version-basis features may be pre-processed or prepared for input to a version-basis clustering machine learning model to perform version-basis clustering. For example, version-basis features may be normalized, standardized, or logarithmically transformed such that the version-basis features are a same scale, and multicollinearities among the version-basis features may be removed through variable clustering and optionally, with manual review. Dimensionality reduction may also be performed on the version-basis features to improve accuracy (of the version-basis clustering machine learning model) by, for example, performing principal component analysis to reduce model complexity and overfitting to training data.

Referring back to FIG. 9, in some embodiments, at step/operation 906, the predictive data analysis computing entity 106 generates, using a version-basis clustering machine learning model, a plurality of version-basis clusters based on the one or more version-basis features.

Cluster data objects may be determined to be similar, with respect to a set of version-basis features, based on a similarity score or a probability associated with the cluster data objects being above a predetermined threshold. That is, a similarity score or probability above the predetermined threshold may be representative of the cluster data objects having a set of version-basis features that are substantially shared (or similar) between the cluster data objects. Accordingly, a version-basis cluster may comprise a plurality of cluster data objects comprising per-cluster set similarity scores or probabilities, relative to each cluster data object within the cluster, which are of at least a predetermined threshold. In some embodiments, a plurality of version-basis clusters may be generated by, for each of a plurality of cluster data objects, (i) determining a probability of the cluster data object belonging to each of a plurality of version-basis clusters and (ii) assigning the cluster data object to one of the plurality of version-basis clusters based on the determined probabilities.

In some embodiments, a version-basis clustering machine learning model describes parameters, hyperparameters, and/or defined operations of a machine learning model that is configured to generate a plurality of version-basis clusters based on one or more version-basis features. According to various embodiments of the present disclosure, a version-basis clustering machine learning model may comprise, for example, a K-means clustering machine learning model configured to generate a plurality of version-basis clusters by determining similarity (e.g., a similarity score or a distance function) between cluster data objects based on a comparison of version-basis features of the cluster data objects and grouping the cluster data objects into a plurality of version-basis clusters based on the determined similarity between the cluster data objects. In other example embodiments, a version-basis clustering machine learning model may comprise a Gaussian mixture machine learning model configured to initialize a plurality of version-basis clusters based on a plurality of Gaussian distributions, determine a probability of the one or more cluster data objects belonging to each of the version-basis clusters, and assigning the one or more cluster data objects to the version-basis clusters based on the determined probabilities.

In some embodiments, at step/operation 908, the predictive data analysis computing entity 106 assigns one or more of a plurality of version-basis cluster labels to respective ones of the plurality of version-basis clusters.

In some embodiments, a version-basis cluster label describes a label assigned to a version-basis cluster. A version-basis cluster label may be representative of a classification of cluster data objects within a version-basis cluster that may be used by a predictive machine learning model to determine prediction parameters, such as weights. For example, version-basis cluster labels "stale" and "vibrant," representative of vibrance or staleness of open-source package versions, may be assigned to respective version-basis clusters. According to various embodiments of the present disclosure, a predictive machine learning model may be trained to predict overall vibrance or staleness of open-source package versions with a machine-labeled dataset and/or a developer-labeled dataset comprising training data objects associated with "stale" and "vibrant" version-basis clusters.

In some embodiments, at step/operation 910, the predictive data analysis computing entity 106 evaluates clustering and labeling of the plurality of version-basis clusters. Evaluating the clustering and labeling of the plurality of version-basis clusters may comprise analyzing partial dependence plots, computing one or more silhouette scores, and comparing clustering results against a set of manually-labeled package examples.

In some embodiments, at step/operation 912, the predictive data analysis computing entity 106 determines whether the plurality of version-basis clusters meets an expectation. The expectation may be based on the version-basis clustering directionally matching one or more of partial dependence plots, silhouette scores reaching a local minimum, or manually-labeled cluster examples reflecting clustering assignment of the plurality of version-basis clusters. In some embodiments, if the plurality of version-basis clusters does not meet the expectation, returning to step/operation 704, the predictive data analysis computing entity 106 retrieves additional one or more version-basis features associated with the version-basis clustering dataset. Otherwise, if the version-basis clusters meets the expectation, version-basis clustering is completed.

Referring back to FIG. 4, in some embodiments, at step/operation 406, the predictive data analysis computing entity 106 provides the prediction output, wherein the prediction output is configured to initiate performance of one or more prediction-based actions based on the prediction output. In some embodiments, the prediction input comprises an identification of one or more open-source packages and versions, the prediction output comprises respective one or more indications of vibrancy or staleness of the one or more open-source packages and versions, and the performance of the prediction-based actions are initiated based on the prediction output.

In some embodiments, initiating performance of the one or more prediction-based actions based on the prediction output includes displaying the prediction output using a prediction output user interface, such as a prediction output user interface. As an example, the prediction output user interface may display a list of most vibrant or most stale open-source packages and versions. Additionally, or alternatively, initiating the performance of the one or more prediction-based actions based on the prediction output may comprise performing a resource-based action (e.g., allocation of resource), generating a diagnostic report (e.g., a list of open-source packages and versions and their vibrancy or staleness ratings), generating and/or executing action scripts, generating alerts or messages, or generating one or more electronic communications based on the prediction output. The one or more prediction-based actions may further include displaying visual renderings of the aforementioned examples of prediction-based actions in addition to values, charts, and representations associated with the prediction output using a prediction output user interface.

Accordingly, as described above, various embodiments of the present disclosure make important technical contributions to improving predictive accuracy of predictive machine learning models by clustering and machine-labeling of training datasets based on different context granularities. This approach improves training speed and training efficiency of predictive machine learning models. It is well-understood in the relevant art that there is typically a tradeoff between predictive accuracy and training speed, such that it is trivial to improve training speed by reducing predictive accuracy. Thus, the challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method comprising: receiving, by one or more processors, a prediction input comprising an identification of one or more open-source packages and versions; generating, by the one or more processors and using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with a plurality of training open-source versions based on the repository data, (e) generating, using a version-basis clustering machine learning model, a plurality of version-basis clusters based on the one or more version-basis features, wherein the plurality of version-basis clusters comprises respective one or more cluster data objects associated with the plurality of training open-source versions. (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and providing, by the one or more processors, the prediction output, wherein the prediction output is configured to initiate the performance of one or more prediction-based actions based on the prediction output.

Example 2. The computer-implemented method of any of the preceding examples, wherein at least one of the package-basis clustering machine learning model or the version-basis clustering machine learning model comprises a Gaussian mixture machine learning model.

Example 3. The computer-implemented method of any of the preceding examples, wherein the predictive machine learning model comprises a semi-supervised machine learning model.

Example 4. The computer-implemented method of any of the preceding examples, wherein the predictive machine learning model is trained based on a combination of a machine-labeled dataset and a developer-labeled dataset.

Example 5. The computer-implemented method of any of the preceding examples, wherein labeling the plurality of data objects further comprises labeling the plurality of data objects with one or more of vibrant, stale, or unlabeled labels.

Example 6. The computer-implemented method of any of the preceding examples, wherein the repository data comprises package release metadata and external repository metrics.

Example 7. The computer-implemented method of any of the preceding examples, wherein the prediction output comprises at least one of a probability of staleness or vibrancy associated with the one or more open-source packages and versions.

Example 8. A computing apparatus comprising memory and one or more processors communicatively coupled to the memory, the one or more processors configured to: receive a prediction input comprising an identification of one or more open-source packages and versions; generate, using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by: (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with the plurality of training open-source versions based on the repository data, (e) generating, using a version-basis clustering machine learning model, a plurality of version-basis clusters based on the one or more version-basis features, wherein the plurality of version-basis clusters comprises respective one or more cluster data objects associated with the plurality of training open-source versions, (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and provide the prediction output, wherein the prediction output is configured to initiate the performance of one or more prediction-based actions based on the prediction output.

Example 9. The computing apparatus of any of the preceding examples, wherein at least one of the package-basis clustering machine learning model or the version-basis clustering machine learning model comprises a Gaussian mixture machine learning model.

Example 10. The computing apparatus of any of the preceding examples, wherein the predictive machine learning model comprises a semi-supervised machine learning model.

Example 11. The computing apparatus of any of the preceding examples, wherein the predictive machine learning model is trained based on a combination of a machine-labeled dataset and a developer-labeled dataset.

Example 12. The computing apparatus of any of the preceding examples, wherein labeling the plurality of data objects further comprises labeling the plurality of data objects with one or more of vibrant, stale, or unlabeled labels.

Example 13. The computing apparatus of any of the preceding examples, wherein the repository data comprises package release metadata and external repository metrics.

Example 14. The computing apparatus of any of the preceding examples, wherein the prediction output comprises at least one of a probability of staleness or vibrancy associated with the one or more open-source packages and versions.

Example 15. One or more non-transitory computer-readable storage media including instructions that, when executed by one or more processors, cause the one or more processors to: receive a prediction input comprising an identification of one or more open-source packages and versions; generate, using a predictive machine learning model, a prediction output based on the prediction input, the prediction output comprising respective one or more ratings of staleness or vibrancy for the one or more open-source packages and versions associated with the prediction input, wherein the predictive machine learning model is trained based on a labeled dataset generated by: (a) determining one or more package-basis features associated with a plurality of training open-source packages based on repository data, (b) generating, using a package-basis clustering machine learning model, a plurality of package-basis clusters based on the one or more package-basis features, wherein the plurality of package-basis clusters comprises respective one or more cluster data objects associated with the plurality of training open-source packages, (c) assigning one or more of a plurality of package-basis cluster labels to respective ones of the plurality of package-basis clusters, (d) determining one or more version-basis features associated with the plurality of training open-source versions based on the repository data. (c) generating, using a version-basis clustering machine learning model, a plurality of version-basis clusters based on the one or more version-basis features, wherein the plurality of version-basis clusters comprises respective one or more cluster data objects associated with the plurality of training open-source versions, (f) assigning one or more of a plurality of version-basis cluster labels to respective ones of the plurality of version-basis clusters, (g) labeling a plurality of training data objects associated with at least a portion of the plurality of training open-source packages and versions based on (i) the assignment of the one or more of the plurality of package-basis cluster labels to the respective ones of the plurality of package-basis clusters and (ii) the assignment of the one or more of the plurality of version-basis cluster labels to the respective ones of the plurality of version-basis clusters; and provide the prediction output, wherein the prediction output is configured to initiate the performance of one or more prediction-based actions based on the prediction output.

Example 16. The one or more non-transitory computer-readable storage media of any of the preceding examples, wherein at least one of the package-basis clustering machine learning model or the version-basis clustering machine learning model comprises a Gaussian mixture machine learning model.

Example 17. The one or more non-transitory computer-readable storage media of any of the preceding examples, wherein the predictive machine learning model comprises a semi-supervised machine learning model.

Example 18. The one or more non-transitory computer-readable storage media of any of the preceding examples, wherein the predictive machine learning model is trained based on a combination of a machine-labeled dataset and a developer-labeled dataset.

Example 19. The one or more non-transitory computer-readable storage media of any of the preceding examples, wherein labeling the plurality of data objects further comprises labeling the plurality of data objects with one or more of vibrant, stale, or unlabeled labels.

Example 20. The one or more non-transitory computer-readable storage media of any of the preceding examples, wherein the repository data comprises package release metadata and external repository metrics.

Example 21. The one or more non-transitory computer-readable storage media of any of the preceding examples, wherein the prediction output comprises at least one of a probability of staleness or vibrancy associated with the one or more open-source packages and versions.

The invention claimed is:

1. A computer-implemented method comprising:
receiving, by one or more processors, a prediction input comprising an identification of one or more of an open-source package or an open source version;
generating, by the one or more processors and using a predictive machine learning model, a prediction output based on the prediction input, the prediction output comprising a stale rating or a vibrancy rating for the one or more of the open-source package or the open source version associated with the prediction input, wherein the predictive machine learning model is trained based on a labeled dataset generated by:
(a) determining a package-basis feature associated with a plurality of training open-source packages based on repository data,
(b) generating, using a package-basis clustering machine learning model, a plurality of package-basis clusters based on the package-basis feature, wherein the plurality of package-basis clusters comprises a package-basis cluster data object associated with the plurality of training open-source packages,
(c) generating a first assignment of a package-basis cluster label of a plurality of package-basis cluster labels to a package-basis cluster of the plurality of package-basis clusters,
(d) determining a version-basis feature associated with a plurality of training open-source versions based on the repository data,
(e) generating, using a version-basis clustering machine learning model, a plurality of version-basis clusters based on the version-basis feature, wherein the plurality of version-basis clusters comprises a version-basis cluster data object associated with the plurality of training open-source versions,
(f) generating a second assignment of a version-basis cluster label of a plurality of version-basis cluster labels to a version-basis cluster of the plurality of version-basis clusters,
(g) labeling a plurality of training data objects associated with at least a portion of the plurality of training open-source packages and the plurality of training open-source versions based on the first assignment and the second assignment;
in response to a determination of the stale rating for the one or more of the open-source package or the open source version based at least in part on the prediction output, determining, by the one or more processors, a computing system comprising the one or more of the open-source package or the open source version; and
performing, by the one or more processors and based on the prediction output, an update to the one or more of the open-source package or the open source version on the computing system to comply with an operational or coding practice.

2. The computer-implemented method of claim 1, wherein at least one of the package-basis clustering machine learning model or the version-basis clustering machine learning model comprises a Gaussian mixture machine learning model.

3. The computer-implemented method of claim 1, wherein the predictive machine learning model comprises a semi-supervised machine learning model.

4. The computer-implemented method of claim 3, wherein the predictive machine learning model is trained based on a combination of a machine-labeled dataset and a developer-labeled dataset.

5. The computer-implemented method of claim 1, wherein labeling the plurality of training data objects further comprises labeling the plurality of training data objects with one or more of vibrant, stale, or unlabeled labels.

6. The computer-implemented method of claim 1, wherein the repository data comprises package release metadata and external repository metrics.

7. The computer-implemented method of claim 1, wherein the prediction output comprises at least one of a probability of staleness or vibrancy associated with the one or more of the open-source package or the open source version.

8. A system comprising one or more processors and at least one memory storing processor-executable instructions that, when executed by any of the one or more processors, cause the one or more processors to perform operations comprising:
receiving a prediction input comprising an identification of one or more of an open-source package or an open source version;
generating, using a predictive machine learning model, a prediction output based on the prediction input, the prediction output comprising a stale rating or a vibrancy rating for the one or more of the open-source package or the open source version associated with the prediction input, wherein the predictive machine learning model is trained based on a labeled dataset generated by:
(a) determining a package-basis feature associated with a plurality of training open-source packages based on repository data,
(b) generating, using a package-basis clustering machine learning model, a plurality of package-basis clusters based on the package-basis feature, wherein the plurality of package-basis clusters comprises a package-basis cluster data object associated with the plurality of training open-source packages,
(c) generating a first assignment of a package-basis cluster label of a plurality of package-basis cluster labels to a package-basis cluster of the plurality of package-basis clusters,
(d) determining a version-basis feature associated with a plurality of training open-source versions based on the repository data,
(e) generating, using a version-basis clustering machine learning model, a plurality of version-basis clusters based on the version-basis feature, wherein the plurality of version-basis clusters comprises a version-basis cluster data object associated with the plurality of training open-source versions, (f) generating a second assignment of a version-basis cluster label of a plurality of version-basis cluster labels to a version-basis cluster of the plurality of version-basis clusters, (g) labeling a plurality of training data objects associated with at least a portion of the plurality of training open-source packages and the plurality of training open-source versions based on the first assignment and the second assignment;

in response to a determination of the stale rating for the one or more of the open-source package or the open source version based at least in part on the prediction output, determining a computing system comprising the one or more of the open-source package or the open source version; and performing, based on the prediction output, an update to the one or more of the open-source package or the open source version on the computing system to comply with an operational or coding practice.

9. The system of claim 8, wherein at least one of the package-basis clustering machine learning model or the version-basis clustering machine learning model comprises a Gaussian mixture machine learning model.

10. The system of claim 8, wherein the predictive machine learning model comprises a semi-supervised machine learning model.

11. The system of claim 10, wherein the predictive machine learning model is trained based on a combination of a machine-labeled dataset and a developer-labeled dataset.

12. The system of claim 8, wherein labeling the plurality of training data objects further comprises labeling the plurality of training data objects with one or more of vibrant, stale, or unlabeled labels.

13. The system of claim 8, wherein the repository data comprises package release metadata and external repository metrics.

14. The system of claim 8, wherein the prediction output comprises at least one of a probability of staleness or vibrancy associated with the one or more of the open-source package or the open-source version.

15. One or more non-transitory computer-readable storage media storing instructions that, when executed by one or more processors, cause the one or more processors to perform operations comprising:

receiving a prediction input comprising an identification of one or more of an open-source package or an open source version;

generating, using a predictive machine learning model, a prediction output based on the prediction input, the prediction output comprising a stale rating or a vibrancy rating for the one or more of the open-source package or the open-source version associated with the prediction input, wherein the predictive machine learning model is trained based on a labeled dataset generated by:

(a) determining a package-basis feature associated with a plurality of training open-source packages based on repository data, (b) generating, using a package-basis clustering machine learning model, a plurality of package-basis clusters based on the package-basis feature, wherein the plurality of package-basis clusters comprises a package-basis cluster data object associated with the plurality of training open-source packages, (c) generating a first assignment of a package-basis cluster label of a plurality of package-basis cluster labels to a package-basis cluster of the plurality of package-basis clusters, (d) determining a version-basis feature associated with a plurality of training open-source versions based on the repository data, (e) generating, using a version-basis clustering machine learning model, a plurality of version-basis clusters based on the version-basis feature, wherein the plurality of version-basis clusters comprises a version-basis cluster data object associated with the plurality of training open-source versions, (f) generating a second assignment of a version-basis cluster label of a plurality of version-basis cluster labels to a version-basis cluster of the plurality of version-basis clusters, (g) labeling a plurality of training data objects associated with at least a portion of the plurality of training open-source packages and the plurality of training open-source versions based on the first assignment and the second assignment;

in response to a determination of the stale rating for the one or more of the open-source package or the open source version based at least in part on the prediction output, determining a computing system comprising the one or more of the open-source package or the open source version; and performing, based on the prediction output, an update to the one or more of the open-source package or the open source version on the computing system to comply with an operational or coding practice.

16. The one or more non-transitory computer-readable storage media of claim 15, wherein at least one of the package-basis clustering machine learning model or the version-basis clustering machine learning model comprises a Gaussian mixture machine learning model.

17. The one or more non-transitory computer-readable storage media of claim 15, wherein the predictive machine learning model comprises a semi-supervised machine learning model.

18. The one or more non-transitory computer-readable storage media of claim 17, wherein the predictive machine learning model is trained based on a combination of a machine-labeled dataset and a developer-labeled dataset.

19. The one or more non-transitory computer-readable storage media of claim 17, wherein labeling the plurality of training data objects further comprises labeling the plurality of training data objects with one or more of vibrant, stale, or unlabeled labels.

20. The one or more non-transitory computer-readable storage media of claim 17, wherein the repository data comprises package release metadata and external repository metrics.

* * * * *